Patented Sept. 13, 1932

1,877,531

UNITED STATES PATENT OFFICE

REINHOLD REICHMANN, OF BERLIN, GERMANY, ASSIGNOR TO SIEMENS-SCHUCKERT-WERKE AKTIENGESELLSCHAFT, OF BERLIN-SIEMENSSTADT, GERMANY, A CORPORATION OF GERMANY

PROCESS FOR THE MANUFACTURE OF BODIES FROM ALUMINUM OXIDE

No Drawing. Application filed July 7, 1931, Serial No. 549,309, and in Germany June 20, 1930.

My invention relates to a process for the manufacture of bodies from aluminium oxide.

The bodies made according to the new process are remarkable for their great mechanical strength and possess considerable electrically-insulating properties.

The new process consists in moulding very finely divided aluminium oxide, which should be as free as possible from any other substances whatsoever, and baking same until it sinters in a surrounding free from reducing carbon at a temperature of at least 1600 deg. C.

The practical manner of carrying out the process is as follows:

Melted and then gound aluminium oxide containing as little foreign ingredients as possible, is mixed with an acid, e. g. hydrochloric acid, to a paste and poured into a gypsum mould without using a binding agent. There it is left till hard enough to be taken out of the mould without injury. The body is then baked at a temperature of over 1600 deg. C. in a surrounding free from carbon, which might have a reducing effect. It sinters thereby to a solid compact body which is extremely hard and has a crystalline structure. A sintering temperature of 1750 deg. C. has proved particularly favorable.

For the body to be manufactured, it is of great importance that no carbon, which has a reducing effect, nor carbon compounds should be used, either inside the body itself, e. g. by employing a binding agent containing carbon to render the mass plastic, or in the surrounding of the body, as carbon having a reducing effect causes the formation of carbide which spoils the homogeneity of the structure and lessens the hardness of the product.

Bodies made according to the new process may be exposed to the electric arc, such as occurs, e. g., in switching operations, without being destroyed in a very short time as is the case with other bodies. This is due to the bodies having a high heat conductivity, through which the injurious differences in temperature, which might cause the body to crack, are greatly avoided. The bodies have proved particularly useful where subjected to mechanical stresses, as in the case of, for instance, insulating parts used for contact drums, in which they serve as running-on and running-off pieces for the finger contacts. Owing to their great mechanical strength, the bodies may be screwed on to their bases or supports, without fear of being overstressed and broken.

I claim as my invention:

1. A process for the manufacture of insulating bodies capable of resisting the electric arc, which comprises molding finely divided aluminium oxide as free as possible from any admixtures whatsoever and then baking the same in a surrounding free from reducing carbon at a temperature of at least 1600 deg. C. until it sinters.

2. A process as claimed in claim 1, in which the body moulded from aluminium oxide is baked at a temperature of 1750 deg. C. until it sinters.

3. A process for a manufacture of electrically insulating bodies capable of resisting the electric arc, which comprises stirring finely divided aluminium oxide, as free as possible from any admixtures whatsoever, with an acid to form a paste, pouring the paste into a gypsum mould and removing it therefrom as soon as can be done without injury to the body, and baking the body in a surrounding free from reducing carbon at a temperature of 1750 deg. C. until it sinters.

4. A process as claimed in claim 3, characterized by the use of hydrochloric acid in stirring the paste.

In testimony whereof I affix my signature.

REINHOLD REICHMANN.